Jan. 19, 1965   G. L. LOOMIS   3,165,918
TESTING TOOL FOR WELL PIPE OR THE LIKE
Filed Feb. 2, 1962   2 Sheets-Sheet 1
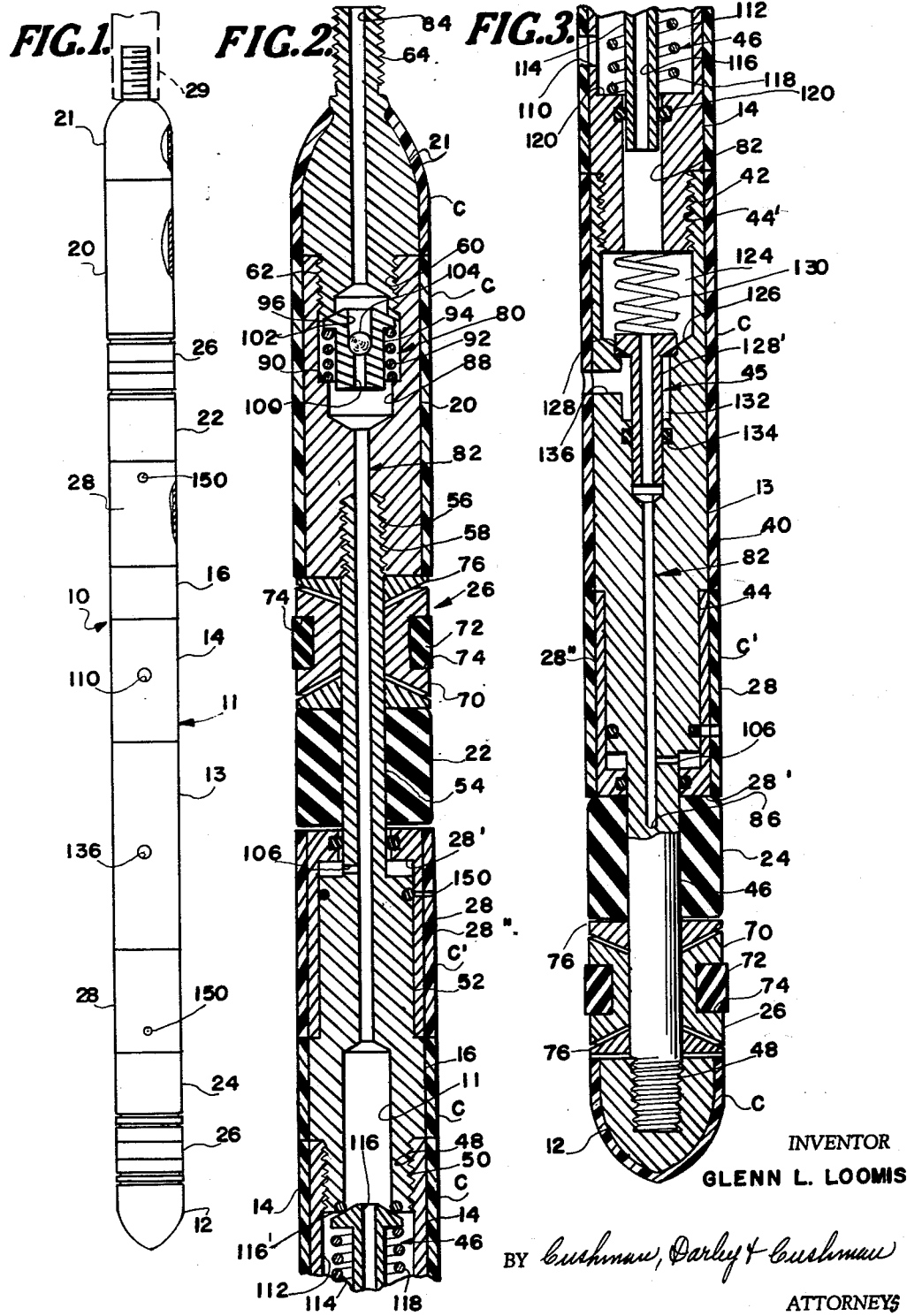
INVENTOR
GLENN L. LOOMIS
BY Cushman, Darby & Cushman
ATTORNEYS Jan. 19, 1965   G. L. LOOMIS   3,165,918
TESTING TOOL FOR WELL PIPE OR THE LIKE
Filed Feb. 2, 1962   2 Sheets-Sheet 2
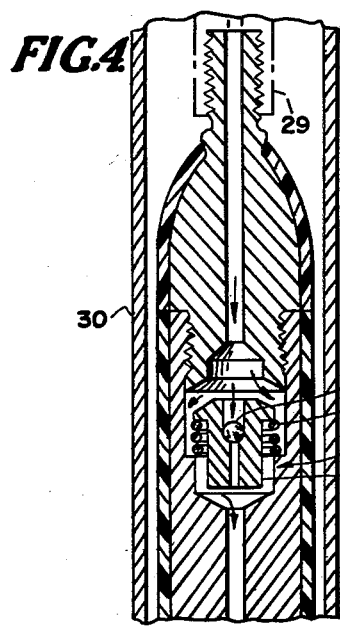
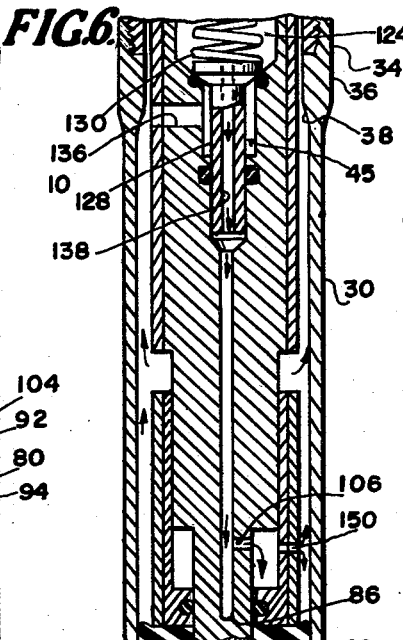
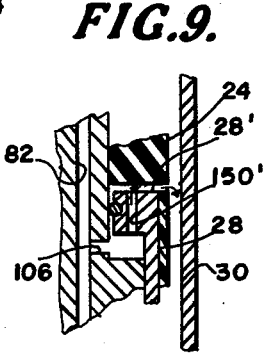
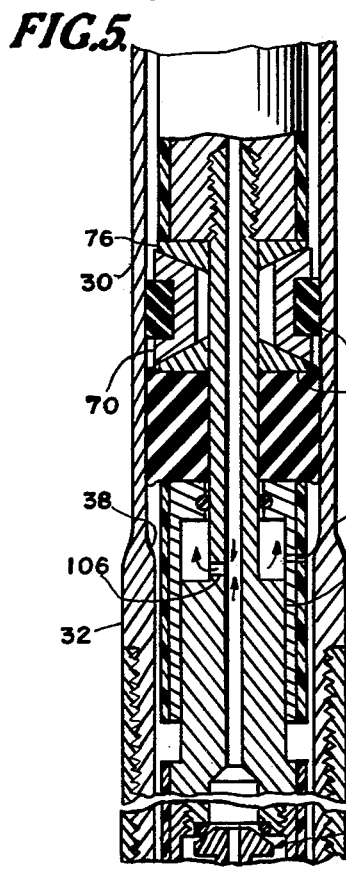
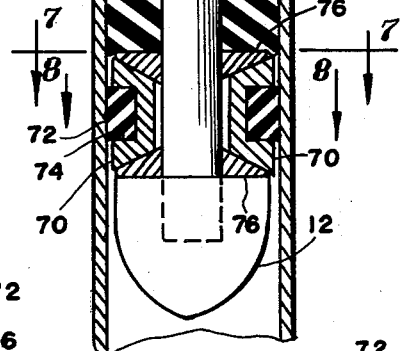
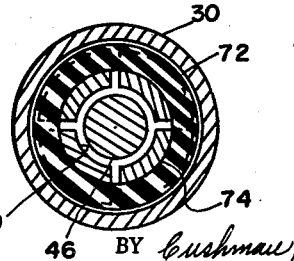
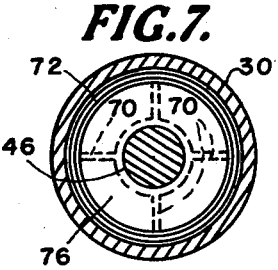
INVENTOR
GLENN L. LOOMIS
BY Cushman, Darby & Cushman
ATTORNEYS

United States Patent Office 3,165,918
Patented Jan. 19, 1965

3,165,918
TESTING TOOL FOR WELL PIPE OR THE LIKE
Glenn L. Loomis, P.O. Box 728, Pasadena, Tex.
Filed Feb. 2, 1962, Ser. No. 170,711
19 Claims. (Cl. 73—40.5)

The present invention relates to a well tool and, more particularly, to a well tool testing device adapted to be inserted into well pipe or the like to test the same for leaks by the application of a fluid under pressure.

This application is an improvement in testing devices of the type disclosed in my prior United States Patent No. 2,731,827, issued January 24, 1956, and Patent No. 2,841,007, issued July 1, 1958. In my aforementioned United States patents, the testing devices disclosed are for use in testing the connections of sections of pipe together by the application of fluid under pressure thereto. Generally, such testing devices comprised a body member with spaced packers thereon and means to expand the packers to seal off a section to be tested as well as means to apply fluid under pressure to the sealed off section.

In recent years, the flow tubing for oil or gas wells or the like has been made with an internal plastic lining. In some instances, the flow tubing itself has been made entirely from plastic although the plastic lined metallic pipe has been more widely accepted. The purpose of lining the pipes or tubing with a plastic is to prevent corrosion of the same from the products being flowed therethrough. The plastic lining in the sections of the pipe is quite fragile and thus in the completion of the wells the sections of pipes must be carefully handled in order to avoid damaging of the plastic lining which would materially reduce the effectiveness of the pipe. Further, pipe sections for the flow tubing have been reduced in diameter in recent years due to advanced techniques in well completion and depth to which wells are now drilled. In many instances, the well pipe sections are provided with an increased wall thickness at their ends as a separate collar is no longer used to connect two sections together. Where one section is provided with female threads and the other section with male threads, the resulting connection of the tubing has an internal upset which further reduces the interior diameter of the same.

An important object of the present invention is to provide a well tool for insertion into plastic lined well pipe or the like, the tool having its external surface coated with a material which is softer than the plastic lining in the well pipe whereby accidental contact of the tool with the plastic lining of the well pipe does not abrade or scratch the same.

Another important object of the present invention is to provide an improved testing device for insertion into well pipe or flow tubing, the testing device having an external surface which will not mar a plastic lining in the well pipe if such lining is contacted by the testing device as it is moved up and down therein.

Still another object of the present invention is to provide a testing device having packers thereon which may be expanded into engagement with the walls of the pipe and which further may be completely relaxed in order to avoid a swabbing or dragging action which might cause abrasion to a plastic-lined well pipe.

Still another object of the present invention is to provide an improved testing device for insertion into well pipe having an extremely small interior diameter, for example, an interior diameter in the order of one and one-half inches or less.

Another object of the present invention is to provide an improved testing tool capable of being lowered a considerable distance down into a well pipe and supplied with fluid through a conduit, the testing device having means to relieve the pressure on its packers caused by the hydrostatic head in the fluid column in the conduit to the surface of the well whereby the packers may be completely relaxed so that the device may be moved to a different area for testing without evacuation of or loss of fluid from the conduit.

Another important object of the present invention is to provide an improved testing tool utilizing a fluid under pressure to set its packers and means to bleed the fluid setting the packers externally of the device.

These and other objects of the present invention will appear more fully in the following specification, claims and drawings in which:

FIGURE 1 is a side elevational view of the testing device embodying the present invention, the fluid conduit to which the testing device is connected being shown in broken lines;

FIGURE 2 is an enlarged fragmentary vertical section of the upper portion of the testing device of FIGURE 1 and illustrating the packer element in its relaxed position;

FIGURE 3 is an enlarged fragmentary vertical section illustrating the lower portion of the testing device of FIGURE 1 with its packer in the relaxed position;

FIGURE 4 is a further enlarged fragmentary vertical section of the upper portion of the testing device, the device being illustrated in a section of well pipe and with fluid under pressure being applied through the fluid conduit;

FIGURE 5 is a view similar to FIGURE 4 but of a portion of the testing device immediately below that portion shown in FIGURE 4;

FIGURE 6 is a view similar to FIGURES 4 and 5 but of that portion of the testing device immediately below the portion shown in FIGURE 5;

FIGURE 7 is a horizontal sectional view taken on line 7—7 of FIGURE 6;

FIGURE 8 is a horizontal sectional view taken on line 8—8 of FIGURE 6;

FIGURE 9 is an enlarged fragmentary view illustrating a modification of the bleed means for bleeding fluid from the interior of the piston elements which expand the packer elements.

Referring now to the drawings wherein like character or reference numerals represent like or similar parts, the testing device 10 disclosed in FIGURE 1 includes an elongated tester body member generally designated by the numeral 11 made up of a plurality of sections 12, 13, 14, 15, 20 and 21. Carried on the tester body member 10 adjacent the upper and lower end portions are a pair of resilient packer elements 22 and 24 which are interposed between abutment members 26 and pistons 28. Packer elements 22 and 24 are cylindrically shaped and have a relaxed diameter less than the smallest inside diameter of the pipe to be tested. Preferably the packer elements 22 and 24 are made from an elastomeric material such as rubber, synthetic rubber or the like. The testing device is adapted to be lowered in the well pipe or flow tubing on the end of a flexible conduit 29 shown in broken lines in FIGURE 1. The flexible conduit 29 is suitably connected to apparatus at the surface of the well for supplying hydraulic fluid to the testing device through the conduit at predetermined desired pressures. Usually the flexible conduit 29 provides the sole support for the testing device as it is lowered or raised in the well tubing, but other means may also be used.

The well pipe to be tested is best shown in section in FIGURES 4, 5 and 6 and usually comprises a plurality of sections of pipe 30 each having male and female ends 32 and 34, respectively, which are threaded together to provide a connection. The pipe sections 30, now widely accepted by the industry, are provided with thickened portions 36 on their male and female ends 32 and 34, respectively, to give rigidity to the joint between sections while having a major wall portion which is relatively thin and consequently there is an inturned upset 38 at each joint which effectively reduces the minimum internal diameter of the pipe.

In the usual practice, the testing device 10 is inserted into the well pipe after the joints or connections between sections of well pipe are assembled at the surface of the well and the test is conducted prior to lowering the pipe into the well. The packer elements 22 and 24 are positioned on opposite sides of the formed joint to be tested and fluid under pressure is then flowed through the conduit 29 into the testing device to first cause the resilient packers 22 and 24 to expand into sealing engagement with the well pipe to thereby seal off the section of well pipe to be tested. Pressure of the hydraulic fluid flowing into the testing device is then increased to the desired test pressure and the hydraulic test fluid flows into the sealed off section externally of the testing tool and applies this pressure to the well pipe. While such tests are usually conducted at the connection of two sections of well pipe 30 together to determine if the connection is leakproof, it, of course, will be understood that the testing of the well pipe may occur at any point along the length of a section or that the testing device 10 may have its body member 11 of such a length that the spaced packers 22 and 24 are spaced apart a distance greater than several joints or connections of sections of well pipe and thus provide a test for a plurality of joint connections simultaneously.

While the above briefly described testing procedure is usually accomplished at the surface of the well as the sections of well pipe are assembled, oftentimes it is desirable to test the well pipe after it has been run into the well casing in order to determine the exact location of leaks in an operating well pipe. When such tests are made, the procedure is substantially the same with the exception that the testing device 10 must be lowered to great depths within the well tubing 30 and the tests must be sequentially accomplished in order to cover all sections of the well pipe. When a leak is discovered in an existing well, the operators know exactly how much of the string of well pipe to withdraw in order to repair the leak or they know exactly where they have to insert suitable well equipment for repairing leaks in situ.

The well pipe 30 now used predominantly in industry is provided with a plastic lining made of an epoxy resin or the like. The plastic lining is coated on the interior of the pipe at the time of manufacture. Since the purpose of this plastic lining is to protect the metallic pipe from corrosive action of the acids encountered in well operation, any damage to the lining will materially reduce the effective life of the well pipe. Consequently, care must be taken in the insertion of well tools into the well pipe of this type in order that the tools do not damage the fragile plastic lining.

Referring now in more detail to FIGURES 2, 3, 4, 5 and 6, the testing tool 10 disclosed therein is capable of insertion into the well pipe 30 and movable from one position to another position without damage to the lining of the well pipe. In addition, the testing device is so arranged that it may be made of a very small diameter in order that it may have proper clearance for passing through the inturned upsets 38 and yet can provide a seal with a maximum inside diameter of the well pipe and test under extremely high pressure conditions. In this respect, the testing device 10 of the present invention is capable of being lowered to extreme depths within the well pipe, as it is provided with novel means for releasing the resilient packer elements completely from engagement with the well pipe after they have been once set without the loss of hydraulic fluid in the conduit 29 which extends to the surface of the well.

The elongated generally tubular body member 11, as previously mentioned, comprises a plurality of sections 12, 13, 14, 16, 20 and 21 which are threaded together as an assembled unit. All of the sections are made of metal such as stainless steel or the like and have their exterior surfaces, which when assembled might contact the well pipe lining, coated with a nonmetallic coating C which is softer than the lining of the well pipe. The nonmetallic coating C may be elastomeric material such as rubber, synthetic rubber or the like, a plastic material such as polyurethane or the like or a fibrous material such as phenolic impregnated fiberglas or the like. The nonmetallic coating materials must be resistant to reaction with the acids and fluids encountered in well operation.

The sections 13, 14 and 16 form the center portion of the testing device 10 and are so designed to support packer elements 22 and 24, abutment members 26 and cylindrical cup-shaped pistons 28. In more detail, the section 13 is provided with a main cylindrical portion 40 provided with internal threads 42 at its upper end and a portion 44 of reduced diameter at its lower end. Extending from the end portion 44 is an elongated stem 46 threaded as indicated at 48 for the reception of the lower nose section 12 which provides the lower nose of the testing tool. The diameter of the portion 40 when it is coated with the nonmetallic coating C provides a maximum diameter for the testing device 10. As will be noted, the nose section 12 is coated with the nonmetallic coating C. The cylindrical cup-shaped piston 28 having a head 28' and a skirt 28'' is adapted to slide on the portion 44 of section 13 and engage the resilient packer 24 to cause the same to compress against the abutment member 26. As will now be evident, the cylindrically shaped packer element 24 and the abutment member 26 are carried on the elongated stem 46 of section 13. Movement of the piston element 28 downwardly from the position shown in FIGURE 3 to the position shown in FIGURE 6 by the application of hydraulic fluid to the interior thereof, as will be explained in more detail later in the specification, compresses the packer element 24 longitudinally against the abutment member 26 causing the packer element to expand transversely into sealing engagement with the well pipe, as shown in FIGURE 6. The piston 28 has its skirt 28'' coated with a nonmetallic coating C' and with this coating has substantially the same external diameter as the portion 40 when it is coated with a nonmetallic coating C.

It will be additionally noted that the section 13 houses the valve means 45 in its portion 40. The function of valve means 45 will be described later in the specification.

The abutment member 26 may be of the type described in my copending application Serially Numbered 170,357, filed February 2, 1962, and entitled "Packer Back-Up Ring," or it may be of the type described in my copending patent application Serially Numbered 170,538, filed February 2, 1962, and entitled "Composite Packer Back-up Ring Structure." In either instance, the abutment member is either arranged so that a portion of its exposed surface which might engage the lining of the well pipe is made of a softer material than the lining of the well pipe or the abutment member is so designed that it will not expand fully into engagement with the lining when the packers or elements are expanded. For purpose of this application and referring to FIGURES 2, 3, 5, 6, 7 and 8, the abutment members 26 include a plurality of arcuate metallic segments 70 held together as a contracted annular unit by a circumscribing band 72 made of an elastomeric material fitting into grooves 74. The band 72 has a radial thickness greater than the depth of grooves 74 and consequently protrudes beyond the outer surface of segments 70. The ends of the segments 70 are shaped to form an inverted cone and two conical shaped rings 76 engage the same. When the piston elements 28 press the packer element 24 against the abutment member, the rings 76 cause the segments 70 to expand outwardly to prevent extrusion of the packer element. Even in the expanded position, the segments do not engage the lining on the well pipe as the band engages the same first and prevents further movement of the segments.

Section 14 has an end portion 44' of reduced diameter which is externally threaded and received in the internal threads 42 of section 13. As will be explained in more detail later in the specification, section 14 is adapted to house valve means 46 which permits the flow of hydraulic fluid under pressure to the sealed off section between the packers 24 after the packers have been set. The upper end of section 14 is internally threaded, as indicated at 48, and is adapted to receive the threaded end 50 of section 16.

Section 16 is similar to section 13 in that it is provided with a portion 52 of reduced diameter for slidably supporting the upper piston element 28 and an elongated stem 54 for supporting both the upper packer element 22 and the upper abutment member 26. The end of the stem 54 is threaded, as indicated at 56.

Section 20 is a housing for the valve means 80 which permits the testing device to be used at great depths in a well pipe. A more detailed description of valve means 80 and its relationship to valve means 45 and 46 will follow in the specification. Section 20 is provided at its lower end with a threaded counterbore 58 and at its upper end with a threaded counterbore 60. The counterbore 58 threadedly receives threads 56 on the stem 54 whereas the counterbore 60 threadedly receives a reduced threaded portion 62 of the upper nose section 21. Section 21 has a threaded upper end portion 64 which is adapted to receive the lower end of the flexible tubular conduit 29.

As best shown in FIGURES 2 and 3, which represent a composite vertical section through the elongated testing device 10 when in the static condition, the elongated tester body member 11 is provided with an axial longitudinally extending bore generally indicated at 82 which is opened at its upper end 84 and closed at its lower end 86. The bore 82 is provided with an enlarged chamber 88 formed in the section 20 for receiving and housing the valve means 80. The chamber 88 has an internal upwardly facing shoulder 90 therein which supports one end of a compression spring 92 that urges a movable plunger valve element 94 toward a downwardly facing annular seat 96 formed in the end of the nose section 21. The valve element 94 includes a bore 100 extending therethrough and having its upper portion enlarged as indicated at 102. The upper portion 102 receives a ball check 104 which is normally seated by gravity and which closes the lower portion of the reduced portion of bore 100 to the flow of hydraulic fluid from the conduit 29. The spring 92 has sufficient tension to maintain the valve element 94 seated against the valve seat 96 when there is a hydrostatic head of hydraulic fluid from the valve means 80 to the surface of the well in the fluid conduit 29. Upon increasing the pressure of the hydraulic fluid in the conduit 29 slightly above the pressure of the hydrostatic head acting on the valve element 94, the valve element 94 moves away from its seat to permit hydraulic fluid to flow downwardly through the bore 82 into and through upper and lower laterally extending passages 106 opening to the undersurface of the upper and lower piston heads 28' respectively. The surge of the hydraulic fluid at the increased pressure into the space beneath the piston heads 28' causes the piston elements 28 to move longitudinally against the respective packer elements 22 and 24 to cause the latter to seal tightly against the wall of the well pipe 30, as shown in FIGURES 5 and 6.

After the packer elements 22 and 24 have been set, as shown in FIGURES 5 and 6, the pressure of the hydraulic fluid is further increased to a predetermined desired pressure for testing, thus causing the valve means 46 to open. Upon opening of valve means 46, the bore 82 is placed in communication with a laterally extending port or passage 110 in the wall of section 14. This permits the hydraulic fluid under the increased pressure to flow externally of the testing device into the sealed off space between the packer element and thus the test pressure is applied to the section of well pipe therebetween. After fluid has filled the sealed off space at the desired test pressure, gauges on the surface equipment are watched to determine whether or not there is a pressure drop. A pressure drop indicates a leak whereas, conversely, the maintaining of pressure indicates a satisfactory joint.

In more detail, section 14 is provided with a chamber or cavity 112 for housing the valve means 46. The valve means 46 includes a plunger type valve element 114 having a tubular bore 116 extending therethrough and axially aligned with and forming part of the bore 82 and an annular downwardly facing valve seat 116' provided on the lower end of the section 16. A compression spring 118 acting on the shoulder 120 in the cavity 112 urges the valve element 114 into seating engagement with the valve seat 116'. By providing the bore 116 through the valve element, hydraulic fluid is permitted to flow unobstructed through the valve element and through the lower transverse passage 106 to the space on the underside of the head 28' of the lower piston element 28. As mentioned above, when sufficient pressure has been applied to set the packer elements 22 and 24, the pressure builds up on the upper side of the head of the plunger valve element 114 causing the valve element 114 to move downwardly against the tension of spring 118, as shown in FIGURE 5, and thus hydraulic fluid flows into the chamber 112 and out through the port of passage 110 to the area being tested. It is important to note that the stem of the plunger valve element 114 extends into the portion of the bore 82 beneath the chamber 112 and an O-ring 120 provides a seal to prevent fluid from flowing into the chamber 112 when the valve element is seated and the packer elements are being set.

Section 13 is provided with a chamber or cavity 124 which houses the valve means 45. The chamber 124 is provided with a shoulder 126 that defines an upwardly facing valve seat 128 which is adapted to be engaged by the head of a plunger valve element 128'. Valve element 128' is spring urged into sealing engagement with the valve seat 128 by means of a spring 130. The stem of valve element 128' extends through an enlarged chamber 132 beneath the valve seat 128 and into a portion of the bore 82 where an O-ring 134 provides a seal therewith. A port or passage 136 in section 13 communicating with the enlarged chamber 132 provides a return for hydraulic fluid when the test is completed and pressure within the testing device is relieved. In other words, after a test has been completed and the pressure is lowered at the surface of the well so that only a hydrostatic pressure remains depending on the length of the conduit 29, the pressure of the fluid between the packer elements just prior to their release is greater than the pressure within the testing device and thus will act on the underside of the head of valve element 128' to compress the spring 130. This opens the valve thereby permitting the fluid to flow through the passage 136 to the interior of the testing device. The fluid will flow upwardly through the bore 116 in valve element 114 and lift the return flow check valve 104 off of its seat, as will now be readily understood.

Valve element 128' is provided with a through bore 138 to permit passage of the hydraulic fluid downwardly through the bore 82 to the space beneath the head 28' of the lower piston element 28.

As will now be evident, the valve elements 94, 114 and 128' are in axial alignment with each other and move on axes which are coincident with the longitudinal axis of the body member 11 and its longitudinally extending bore 82. By such a specific arrangement of the valve elements and their valve seats, the overall diameter of the testing device may be reduced to a minimum whereby the testing device may be utilized to test well pipes of extremely small diameters in the order of an inch and a half or less. Since the springs which urge the respective valve elements to their closed position are arranged on the longitudinal axis of the body member, their length and spring coefficient can be made sufficiently large so that the valves can accommodate the extremely high pressures necessary for testing deep wells.

As mentioned above, the provision of the valve means 80 which compensates for the hydrostatic pressure in the conduit 29 permits complete relaxation of the packers when testing at extreme depths without the loss of hydraulic fluid in the conduit 29 or the evacuation of the fluid from the conduit 29. Further means are provided for assisting in the complete relaxation of the packer elements after a test is completed. As best shown in FIGURES 5 and 6, each piston element 28 is provided with a radially extending passage 150 in the wall of its skirt 28" whereby hydraulic fluid trapped beneath the piston head is permitted to bleed off as the pressure reduces and the piston element retracts. While the passage 150 is open when the piston elements are extended after pressure has been initially applied to the hydraulic fluid, such a bleed does not affect the test or the pressure as the passage 150 opens to the sealed off area between the packers and the pressure on the interior of piston is the same as the exterior pressure. Further, the bleed opening of passage 150 does not affect the initial extension of the piston elements as the surge of hydraulic fluid into the space beneath the heads 28' of the piston elements 28 is great enough to move the same as the passages 106 are larger than the bleed passages 150.

FIGURE 9 discloses a slight modification in the piston 28 wherein the bleed passage or port 150' is provided in the head 28'. In this arrangement, the initial surge of pressure through the passage 106 to the underside of the piston head 28' causes the piston 28 to abut against the packer element 24 and close off the end of the bleed passage 150'. When the pressure in the bore 82 is relieved and the resiliency of the packer element 24 pushes the piston toward its retracted position, the passage 150' is opened up and any fluid trapped beneath the piston head bleeds outwardly between the piston head and the packer externally of the testing device.

While the well tool described above fully accomplishes the objects and advantages of the invention, it is, of course, within the scope of the present invention that certain changes and modifications may be made without departing from the spirit of the invention. Therefore, the terminology used in this specification is for the purpose of description and not for limitation as the scope of the invention is defined in the claims.

What is claimed is:

1. In a testing device adapted to be connected to a fluid conduit and lowered into a well pipe or the like for testing the same with a testing fluid under pressure supplied through the conduit: an elongated body member having a generally longitudinally extending bore therein communicating with the conduit at its upper end and closed at its lower end, at least one packer element mounted exteriorly on each end portion of said body member, each packer element having a smaller outside diameter than the inside diameter of the pipe to be tested, means for expanding said packers into sealing engagement with the well pipe to seal off a section of the same and to then supply fluid under pressure to the sealed off section, said means including passages communicating with said bore for supplying fluid pressure to expand the packer elements and a passage in said body member opening to the outside of the same between said packer elements and having a pressure responsive valve member therein normally closing the same to said bore, said valve member being operable at a predetermined pressure to permit fluid to flow into the sealed off section of well pipe, and valve means in said bore adjacent the end of the same connected to the conduit, said last-mentioned valve means being normally closed to prevent flow of fluid through said bore and said passages to said packer elements, said last-mentioned valve means being pressure responsive to open when pressure of fluid in the conduit is increased above the pressure of its hydrostatic head on said last-mentioned valve means whereby fluid can be maintained in the conduit in between tests.

2. The testing device of claim 1 wherein said body member is provided with a non-metallic coating entirely covering the exposed surfaces of the same.

3. The well tool of claim 2 wherein said nonmetallic coating is an elastomeric material.

4. The well tool of claim 2 wherein said nonmetallic coating is a plastic material.

5. The well tool of claim 2 wherein said nonmetallic coating is a fibrous material.

6. In a testing device adapted to be connected to a fluid conduit and lowered into a well pipe or the like for testing the same with a testing fluid under pressure supplied through the conduit: an elongated body member having a generally longitudinally extending bore therein communicating with the conduit at its upper end and closed at its lower end, at least one packer element mounted exteriorly on each end portion of said body member, each packer element having a smaller outside diameter than the inside diameter of the pipe to be tested, means for expanding said packers into sealing engagement with the well pipe to seal off a section of the same and to then supply fluid under pressure to the sealed off section, said means including passages communicating with said bore for supplying fluid pressure to expand the packer elements and a passage in said body member opening to the outside of the same between said packer elements and having a pressure responsive valve member therein normally closing the same to said bore, said valve member being operable at a predetermined pressure to permit fluid to flow into the sealed off section of well pipe, and valve means in said bore adjacent the end of the same connected to the conduit, said last-mentioned valve means being normally closed to prevent flow of fluid through said bore and said passages to said packer elements, said last-mentioned valve means being pressure responsive to open when pressure of fluid in the conduit is increased above the pressure of its hydrostatic head on said last-mentioned valve means whereby fluid can be maintained in the conduit in between tests, said last-mentioned valve means including a reverse flow check valve whereby fluid beneath the last-mentioned valve means may flow up through said last-mentioned valve means when pressure of fluid beneath said last-mentioned valve means is greater than hydrostatic pressure above said last-mentioned valve means.

7. In a testing device adapted to be connected to a fluid conduit and lowered into a well pipe or the like for testing the same with a testing fluid under pressure supplied through the conduit: an elongated body member having a generally longitudinally extending bore therein communicating with the conduit at its upper end and closed at its lower end, at least one packer element mounted exteriorly on each end portion of said body member, each packer element having a smaller outside diameter than the inside diameter of the pipe to be tested, abutment means on each end portion of the body member and abutting the ends of said packer elements respectively to retain and limit longitudinal movement of the same, a pair of cylindrical cup-shaped piston elements slidably mounted on said body member and respectively abutting said packer elements on opposite ends from said abutment means, means including continuously open passages in said tester member communicating with said bore and with the interior of said piston elements for supplying fluid under pressure from said bore to the interior of said piston elements for moving the same against said packer elements to compress the same longitudinally against said abutment means and expand transversely to seal off a section of well pipe, means for supplying fluid under pressure from said bore into the sealed off section of well pipe, and means through each of said piston elements for bleeding fluid from the interior of said piston elements to the exterior of the testing device whereby the packer elements can be completely relaxed.

8. The testing device of claim 7 wherein said bleed means includes at least one passage in the wall of each of said piston elements extending radially outwardly of the same.

9. The testing device of claim 7 wherein each of said cylindrical cup-shaped piston elements has a head portion for abutting the respective packer elements and wherein said bleed means includes at least one passage in said head element extending longitudinally of the piston element and communicating the interior of the same with the exterior when pressure of fluid is relieved in said bore.

10. In a testing device adapted to be connected to a fluid conduit and lowered into a well pipe or the like for testing the same with a testing fluid under pressure supplied through the conduit: an elongated body member having a generally longitudinally extending bore therein communicating with the conduit at its upper end and closed at its lower end, at least one packer element mounted exteriorly on each end portion of said body member, each packer element having a smaller outside diameter than the inside diameter of the pipe to be tested, abutment means on each end portion of the body member and abutting the ends of said packer elements respectively to retain and limit longitudinal movement of the same, a pair of cylindrical cup-shaped piston elements slidably mounted on said body member and respectively abutting said packer elements on opposite ends from said abutment means, means including continuously open passages in said tester member communicating with said bore and with the interior of said pistons for supplying fluid under pressure from said bore to the interior of the pistons for moving the same against said packer elements to compress the packer elements longitudinally against said abutment means and expand them transversely to seal off a section of well pipe, means for supplying fluid under pressure from said bore into the sealed off section of well pipe, means through each of said piston elements for bleeding fluid from the interior of said piston elements to the exterior of the testing device whereby the packer elements can be completely relaxed, and valve means in said bore positioned adjacent the end of the same and connected to the conduit, said last-mentioned valve means being normally closed to prevent flow through said bore and said passages to said piston elements, said last-mentioned valve means being opened when pressure fluid in the conduit is increased above the pressure of its hydrostatic head on said last-mentioned valve means whereby fluid can be maintained in the conduit in between tests without exerting a pressure on the interior of said piston elements.

11. The testing device of claim 10 wherein said last-mentioned valve means includes a reverse flow check valve whereby fluid beneath the last-mentioned valve means may flow upwardly through said last-mentioned valve means when pressure of fluid beneath said last-mentioned valve means is greater than hydrostatic pressure of fluid above said last-mentioned valve means.

12. The testing device of claim 11 wherein said bleed means includes at least one passage in the wall of said piston element extending radially outwardly of the same.

13. The testing device of claim 11 wherein each of said cylindrical cup-shaped piston elements has a head portion for abutting the respective packer elements and wherein said bleed means includes at least one passage in said head element extending longitudinally of the piston element and communicating the interior of the same with the exterior when pressure of fluid beneath said valve means is relieved.

14. In a testing device adapted to be connected to a fluid conduit and lowered into a well pipe or the like for testing the same with a testing fluid under pressure supplied through the conduit: an elongated body member having a generally longitudinally extending bore therein concentric with the axis of the body member and communicating with the conduit at its upper end and closed at its lower end, at least one packer element mounted on each end portion of said body member and expansible into engagement with the well pipe, means to expand said packer elements to seal off a section of the well pipe, a first passage in said body member extending transversely from the bore to the exterior of the body member intermediate the packer elements, a second passage in said body member extending transversely from the bore to the exterior of the body member, said second passage being longitudinally spaced from said first passage, a first valve means in said body member for normally closing said first passage from flow of fluid from said bore until fluid in said bore has reached a predetermined pressure, said first valve means including a valve seat in said body member concentric of said bore and a plunger valve element having its longitudinal axis coincident with the longitudinal axis of said bore and being spring urged against said seat, said plunger valve element having a longitudinally extending open bore therethrough to provide open communication in the bore in said body member, a second valve means arranged in said body member in axial alignment with said first valve means and normally closing said second passage from the bore in said body member, said second valve means being open when fluid in said second passage has a higher pressure than fluid in said bore whereby fluid can flow from the section tested through the second passage into said bore, said second valve means including a seat in said body member concentric with said bore and a plunger valve element cooperating with said seat and axially aligned with the plunger valve element of said first valve means, said last-mentioned plunger valve element having a longitudinally extending open bore therethrough to provide open communication in the bore in said body member.

15. A testing device of claim 14 wherein said means to expand said packer elements to seal off a section of the well pipe includes cylindrical cup-shaped piston elements slidably mounted adjacent each packer element for engaging and expanding the packer element and a passage in said body member open to the interior of the piston and to the bore whereby fluid under pressure moves the piston element, and valve means in said body member positioned adjacent the end of the bore connected to the conduit and normally closing said bore to the flow of fluid from the conduit, said last-mentioned valve means being operable to open position upon a pressure greater than the hydrostatic pressure of fluid in the conduit above the same.

16. The testing device of claim 15 wherein said last-mentioned valve means is arranged in said body member in axial alignment with said first-mentioned valve means above the same.

17. The testing device of claim 15 wherein said last-mentioned valve means includes a valve seat in said body member concentric of said bore and a valve element movable on the longitudinal axis of the bore.

18. The testing device of claim 17 wherein the valve element in said last-mentioned valve means includes a reverse flow check valve whereby fluid beneath the valve element may flow up through the valve element when pressure of the fluid beneath the same is greater than hydrostatic pressure of the fluid acting on the valve element.

19. The testing device of claim 14 wherein said body member is provided with a nonmetallic coating covering the exposed surfaces of the same, said nonmetallic coating being softer than the interior wall of the well pipe whereby engagement of the testing device with the same does not scratch the same.

References Cited by the Examiner

UNITED STATES PATENTS

| 1,573,031 | 2/26 | Bettis et al. | |
| 2,651,199 | 9/53 | Collins et al. | 33—205 X |
| 2,731,827 | 1/56 | Loomis | 73—40.5 |
| 2,946,388 | 7/60 | Evans | 166—187 X |
| 2,998,721 | 9/61 | Gawlik | 73—40.5 X |

ISAAC LISANN, *Primary Examiner.*